US008622399B2

United States Patent
Monteil

(10) Patent No.: US 8,622,399 B2
(45) Date of Patent: Jan. 7, 2014

(54) COMPOSITE SEALING GASKET AND PROCESS FOR BELLING PLASTIC PIPE

(75) Inventor: Guillermo Monteil, San Jose (CR)

(73) Assignee: S & B Technical Products, Inc., Fort Worth, TX (US)

( * ) Notice: Subject to any disclaimer, the term of this patent is extended or adjusted under 35 U.S.C. 154(b) by 0 days.

(21) Appl. No.: 13/535,459

(22) Filed: Jun. 28, 2012

(65) Prior Publication Data

US 2013/0001821 A1    Jan. 3, 2013

Related U.S. Application Data

(62) Division of application No. 12/207,555, filed on Sep. 10, 2008, now abandoned.

(51) Int. Cl.
*B29C 45/14* (2006.01)

(52) U.S. Cl.
USPC .......................................... 277/616; 277/626

(58) Field of Classification Search
USPC ......... 277/602, 936, 615, 616, 608, 626, 627; 285/231, 232, 110, 113, 345, 379
See application file for complete search history.

(56) References Cited

U.S. PATENT DOCUMENTS

| 4,834,430 | A  | * | 5/1989  | Vassallo et al. | 285/379  |
|-----------|----|---|---------|-----------------|----------|
| D330,073  | S  | * | 10/1992 | Valls           | D23/269  |
| 6,142,484 | A  | * | 11/2000 | Valls, Jr.      | 277/602  |
| 6,328,309 | B1 | * | 12/2001 | Corbett, Jr.    | 277/314  |
| 6,378,915 | B1 | * | 4/2002  | Katz            | 285/342  |
| 7,252,293 | B2 | * | 8/2007  | Happel          | 277/624  |
| 7,731,884 | B2 | * | 6/2010  | Knapp et al.    | 264/259  |
| 8,074,996 | B2 | * | 12/2011 | Darce et al.    | 277/314  |

* cited by examiner

*Primary Examiner* — Gilbert Lee
(74) *Attorney, Agent, or Firm* — Charles D. Gunter, Jr.

(57) ABSTRACT

An sealing gasket is shown for use in forming joints of plastic pipe. The gasket is formed as a composite elastomeric body with a leading region formed of a thermoplastic elastomer material and with a trailing region formed of a synthetic plastic material. The gasket body has an outer circumferential region provided with a series of recessed pocket which give it a scallop-like appearance. The relatively harder plastic region of the gasket body deforms the associated pipe socket end during manufacture of the pipe end, whereby the gasket is integrally locked within an internal pipe groove in the pipe socket end upon completion of the pipe belling operation.

4 Claims, 3 Drawing Sheets

COMPOSITE SEALING GASKET AND PROCESS FOR BELLING PLASTIC PIPE

CROSS REFERENCE TO RELATED APPLICATIONS

The present application is a divisional application of earlier filed Ser. No. 12/207,555, filed Sep. 10, 2008, entitled "Composite Sealing Gasket and Process for Belling Plastic Pipe", by Guillermo Monteil.

BACKGROUND OF THE INVENTION

1. Field of the Invention

The present invention relates generally to sealing systems for thermoplastic pipes and, more specifically, to an improved pipe gasket and to an improved belling process for installing a gasket in a socket end of a thermoplastic pipe.

2. Description of the Prior Art

Pipes formed from thermoplastic materials including polyethylene and PVC are used in a variety of industries. In forming a joint between sections of pipe, the spigot or male pipe end is inserted within the female or socket pipe end. An annular, elastomeric ring or gasket is typically seated within a groove formed in the socket end of the thermoplastic pipe. As the spigot is inserted within the socket, the gasket provides the major seal capacity for the joint. It is critical, during the installation process, that the gasket not be able to twist, flip or be displaced, since a displaced or dislocated gasket will adversely affect the ultimate sealing capacity of the joint.

In the early 1970's, a new technology was developed by Rieber & Son of Bergen, Norway, referred to in the industry as the "Rieber Joint." The Rieber system employed a combined mold element and sealing ring for sealing a joint between the socket end and spigot end of two cooperating pipes formed from thermoplastic materials. In the Rieber process, the elastomeric gasket was inserted within an internal groove in the socket end of the female pipe as the female or belling end was simultaneously being formed. The provision of a prestressed and anchored elastomeric gasket during the belling process at the pipe factory provided an improved socket end for a pipe joint with a sealing gasket which would not twist or flip or otherwise allow impurities to enter the sealing zones of the joint. These features increased the reliability of the joint and decreased the risk of leaks or possible failure due to abrasion or other factors. The Rieber process is described in the following issued U.S. Pat. Nos. 4,120,521; 4,061,459; 4,030,872; 3,965,715; 3,929,958; 3,887,992; 3,884,612; and 3,776,682.

In the Rieber process, the gasket is installed in a circumferential groove provided upon the working surface of a mandrel and abuts a backup collar which helps to position and retain the gasket during the subsequent belling operation. The associated thermoplastic pipe was then heated and the heated thermoplastic pipe end was forced over the mandrel and gasket. The pipe socket end was deformed by the gasket and an internal retention groove was formed in the interior of the pipe end. The pipe end was then cooled so that it would retain its shape and the mandrel was retracted, leaving the sealing gasket fixed within the retention groove.

In the Rieber process, the gasket always included an internal metal reinforcing component which circumscribed the gasket body and gave it additional rigidity. The metal component, either a band or wire, was bonded to the rubber and acted as the structural member to keep the gasket engaged in the pipe socket after the belling operation was complete. As such, although the pipe wall was formed over the Rieber gasket, the two components were discrete.

Other commercial gaskets available in the industry, for example the Forsheda POWER LOCK® and the Vassallo EPSMI®, did not utilize a bonded metal component, but instead used a hard polymer component for the trailing region (ramp). The hard polymer component acted in the same structural manner as the metal component in the original Rieber belling operation. As such, the hard polymer portion of the gasket was necessarily heavy with a relatively thick cross section. The pipe wall was formed over the gasket and these two components again remained discrete in the final assembly. In those cases where material was removed from the trailing region of the gasket, as in the Vassallo gasket, it was removed to reduce mass while retaining structural integrity.

A need exists, therefore, for an improved sealing gasket for use in a Rieber type manufacturing process, which sealing gasket would be even more positively and "integrally locked" within the retention groove of the socket pipe end during the belling operation.

A need also exists for such a sealing gasket which would be simple in design and simple to manufacture and which could also be used without the necessity of modifying the design of existing belling machines.

A need also exists for such a sealing gasket which, because of its composite construction, would eliminate the need for an internal reinforcing ring, thereby reducing the cost of the gasket and simplifying the belling operation and improving the cycle time of the manufacturing operation.

A need also exists for such a sealing gasket which, due to its composition, would eliminate the need for the use of a lubricant during the belling operation.

A need also exists for such a gasket which could be color coded so that, for example, the gasket could be coded according to size or end use.

A need also exists for such a gasket which, due to its composition, could utilize recycled scrap, thereby eliminating much of the scrap waste present in conventional belling operations.

SUMMARY OF THE INVENTION

The present invention has as its object to provide an improved sealing gasket, an improved pipe belling process, and an improved pipe assembly method, all of which meet the needs described in the prior art and which meet the previous objectives. The belling process and pipe joint of the invention uses a special "scallop" design in a hard polymer region of the gasket body to integrate the gasket and the pipe wall. As compared to the previously described Rieber and Forsheda processes, the pipe wall and the trailing region (ramp) interface of the gasket body is no longer two smooth mating surfaces. Now the pipe wall is formed over the gasket at a temperature above its glass transition temperature. Then, either using vacuum or pressure, the pipe wall is forced to flow into cavities formed by the scalloped regions of the gasket. Now integrated with the pipe wall, the hard polymer component of the subject gasket is no longer required to act as the discrete structural member seen in the previous gasket designs described in the prior art. The structural integration apparent in the new design provides for optimal design of the trailing region of the gasket body.

The improved pipe sealing gasket of the invention is designed for receipt within a groove provided within a socket end of a thermoplastic pipe. The gasket has a ring shaped composite elastomeric body which, when viewed in cross section, has a leading region formed of a thermoplastic elastomer material (TPE) and which has a trailing region formed of a synthetic plastic material. The leading region has an outer surface and an inner primary compression sealing surface which forms a compression seal with the exterior surface of the mating male pipe when the mating male pipe is inserted within the socket end of the thermoplastic pipe to form a pipe joint. The trailing body region of the gasket has a series of recessed pockets formed on an outer surface thereof which provide a scallop-like pattern on the outer surface of the trailing region of the gasket body.

Preferably, the thermoplastic elastomer material is selected from the group consisting of thermoplastic elastomers (TPE's) and thermoplastic vulcanizable elastomers (TPV's). The preferred material for the synthetic plastic material is preferably a polyolefin material, such as polypropylene. The recessed pockets which provide the scallop-like pattern on the outer surface of the trailing region of the gasket body are preferably located at evenly spaced locations about an outer circumferential region of the gasket body. The resulting outer circumferential region of the gasket body contacts and deforms the groove provided within the socket end of a thermoplastic pipe during pipe belling operations as the heated pipe end is flowed, to thereby integrally lock the gasket body within the pipe bell during the belling operation.

In the method of forming a pipe joint of the invention, a sealing gasket of the type previously described is pre-located within a groove provided within a female socket end of a first section of pipe in a Rieber style manufacturing process. The spigot end of one section of thermoplastic pipe is then inserted within the socket end of a second pipe section to form a pipe joint. The socket end of the thermoplastic pipe terminates in a mouth region with the groove being located adjacent the mouth region. Upon assembly of the joint, the primary compression seal region of the gasket body forms a compression seal with the mating spigot pipe end.

In the improved pipe belling method of the invention, a forming mandrel is provided with an inner end and an outer end, the mandrel also having an outer working surface. An improved gasket of the type previously described is installed at a first circumferential position on the outer working surface of the mandrel. The first circumferential region preferably comprises a circumferential groove having opposing sidewalls, and wherein the gasket body is seated within the circumferential groove so that the thermoplastic pipe is forced over the trailing region of the gasket body and then over the leading region thereof. Heating the thermoplastic pipe end above the glass transition temperature allows the resulting rubbery polymer to flow about the gasket body, including the scalloped regions. This action of the heated socket end of the thermoplastic pipe flowing over the gasket also forms the retention groove which ultimately retains the sealing gasket. The heated socket end of the thermoplastic pipe is then cooled and the socket end is retracted from the mandrel, whereby the gasket is retained within an internal groove which is formed in the interior of the female, belled pipe end. The unique composition and geometry of the gasket of the invention insures that the gasket body is integrally locked into position within the retention groove provided in the socket pipe end.

Additional objects, features and advantages will be apparent in the written description which follows.

DETAILED DESCRIPTION OF THE INVENTION

The embodiments herein and the various features and advantageous details thereof are explained more fully with reference to the non-limiting embodiments that are illustrated in the accompanying drawings and detailed in the following description. Descriptions of well-known components and processes and manufacturing techniques are omitted so as to not unnecessarily obscure the embodiments herein. The examples used herein are intended merely to facilitate an understanding of ways in which the invention herein may be practiced and to further enable those of skill in the art to practice the embodiments herein. Accordingly, the examples should not be construed as limiting the scope of the claimed invention.

Figure 3:
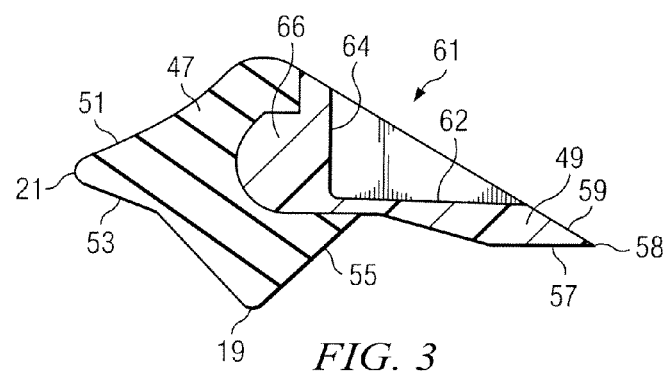
FIG. 3 is a cross-sectional view of the gasket of the invention showing the relative leading and trailing body regions thereof.
Figure 4:
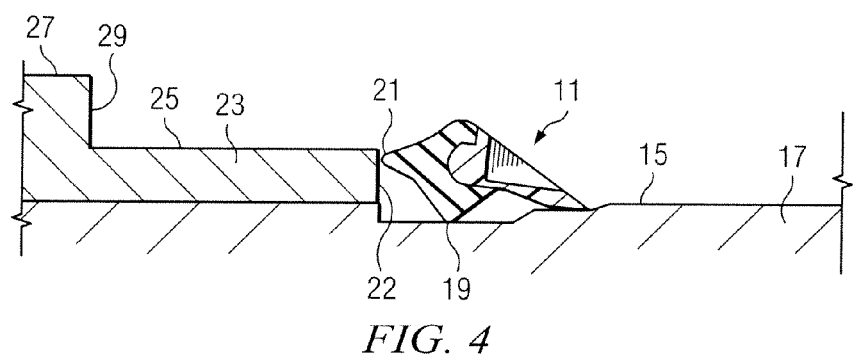
FIGS. 4-7 illustrate the prior art Rieber pipe forming process with the pipe gasket of the invention in place on the outer working surface of the belling mandrel.
Figure 5:
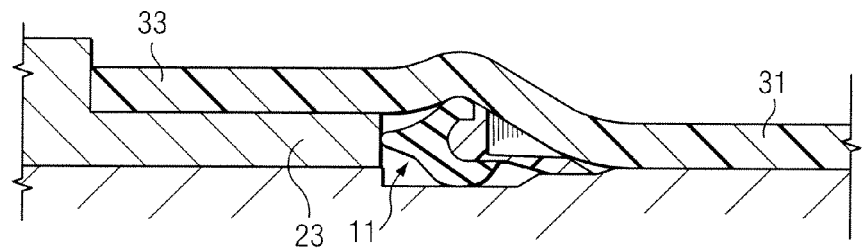
Figure 6:
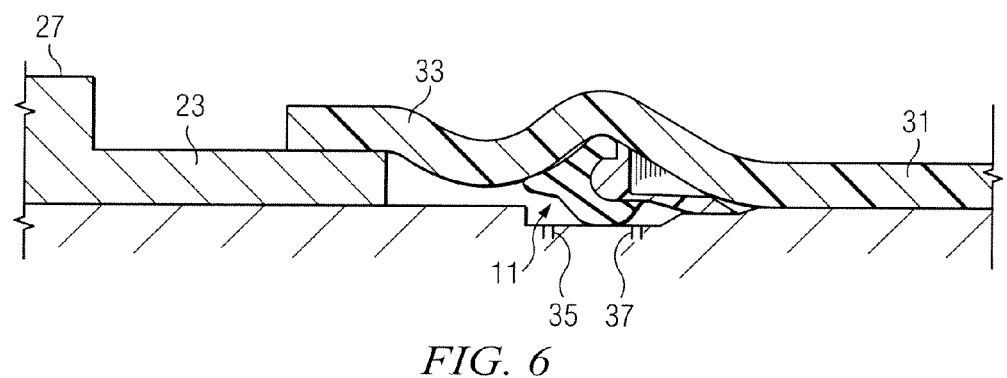
Figure 7:
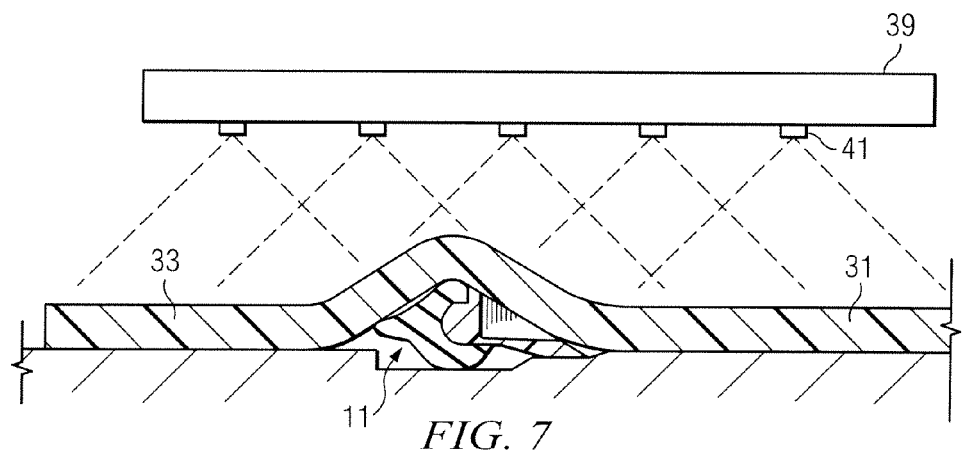

The primary advantages of the present invention can perhaps be best understood with reference to a simplified discussion of the prior art Rieber pipe belling process and with reference first to FIGS. 4-7 of the drawings. FIG. 4 shows a section of the improved composite elastomeric sealing gasket of the invention 11 in place on the generally cylindrical outer working surface 15 of the mandrel 17 used in the belling process. It should be noted that, because of the composite nature of the improved gasket of the invention, there is no need for a metal reinforcing ring to be embedded in the gasket body. The exact make-up of the composite elastomeric gasket 11 will be further described below. As can be seen from FIG. 2, the gasket is a ring shaped, circumferential member having an inner compression surface (19 in FIGS. 3-4) and an exposed nose portion 21 which, as shown in FIG. 4, abuts a backup or forming collar 23. The nose portion 21 forms a contact area for contacting the lip portion 22 of the backup collar 23. The backup collar 23 FIG. 4) has a first generally cylindrical extent 25 which is joined to a second cylindrical extent 27 by a step region 29, whereby the second extent 27 is of greater external diameter than the first cylindrical extent 25. The lip portion 22 of the backup collar 23 forms a right angle with respect to the working surface 15 of the mandrel 17.

In the first step of the Rieber pipe belling process, the composite gasket 11 is placed onto the working surface of the mandrel 17 and pushed to a position against the back-up or forming collar 23. In this position, the gasket is anchored to the mandrel surface.

In the second step of the manufacturing process, the socket end 33 of the thermoplastic pipe 31 (FIG. 5) is heated and pushed over the steel mandrel 17, gasket 11 and back-up collar 23. The socket end 33 is expanded due to the thermoplastic nature of the pipe. A number of thermoplastic materials, such as polyethylene, polypropylene and polyvinylchloride (PVC) are known in the prior art having the required expansion characteristics, depending upon the end application of the pipe joint. The preferred material for the pipe is PVC. The socket end 33 of the PVC pipe flows over the first cylindrical extent 25 of the back-up collar 23 and abuts the step region 29 in the second step of the process.

In the next step of the pipe belling process (FIG. 6) the mandrel and pipe move away from the back-up collar 23 and the pipe socket end 33 retracts around the mandrel and gasket 11 due to the elastic forces of the thermoplastic material. Typically, a vacuum is also applied through ports 35, 37 which connected the mandrel working surface with a vacuum source (not shown).

In the final step of the process (FIG. 7), the pipe socket end 33 is cooled by means of a water spray bar 39 and spray nozzles 41. As the cooling takes place, the pipe socket end 33 shrinks around the gasket 11.

The above described Rieber process has been in commercial use since the early 1970's and is described in the above referenced issued United States patents, among other sources. It will thus be well familiar to those skilled in the thermoplastic pipe sealing arts. However, it is the particular geometry and composition of the improved sealing gasket 11 of the invention which results in an improved pipe product. These features of the gasket 11 will now be described in greater detail.

Figure 1:
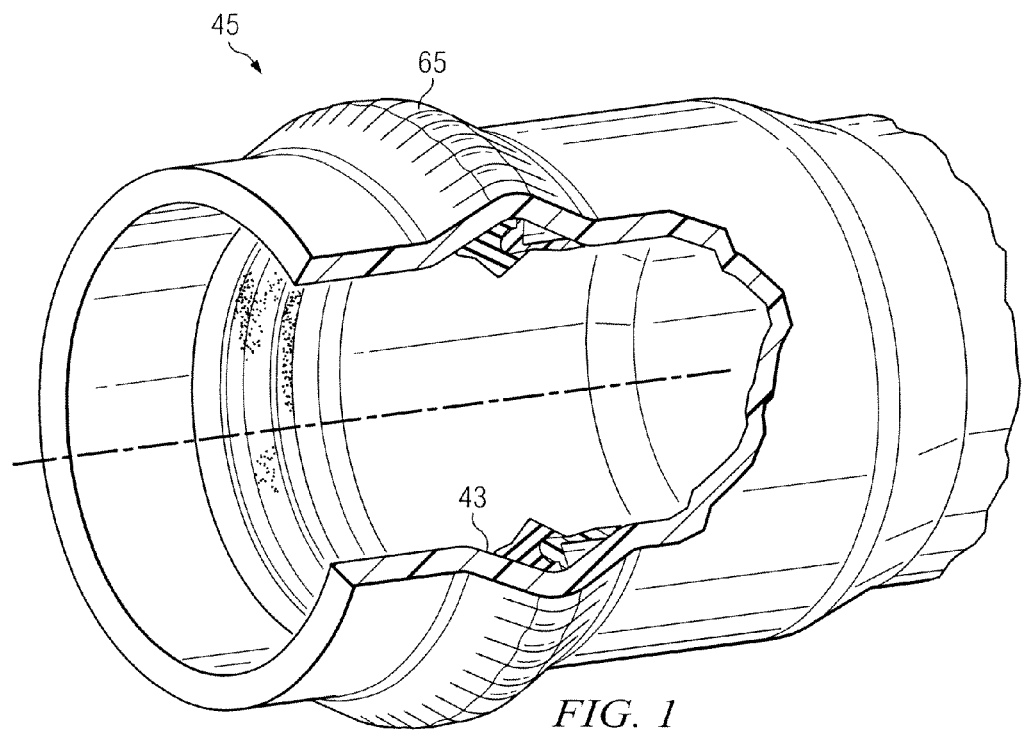
FIG. 1 is a perspective view of the socket end of a section of thermoplastic pipe, partly broken away, and showing the sealing gasket of the invention in cross-section and installed within the internal retention groove of the pipe.

FIG. 1 of the drawings shows the pipe sealing gasket of the invention, which is designated generally as 11, the gasket being received within a groove (43 in FIG. 1) provided within a socket end 45 of a thermoplastic pipe. The pipe socket end (45 in FIG. 1) has been formed about the gasket 11 of the invention using the previously described Rieber process. As will be appreciated from FIGS. 1 and 3, the sealing gasket 11 of the invention has a ring shaped composite elastomeric body which, when viewed in cross section (FIG. 3), has a leading region 47 formed of a "thermoplastic elastomer material" or (TPE), and which has a trailing region 49 formed of a "synthetic plastic material."

As can be seen in FIG. 3, the leading region 47 of the gasket body has an outer surface 51 which continues around the nose portion 21 to form an inner surface 53 which slopes downwardly as viewed in FIG. 3 to form a primary compression sealing surface (shown generally as 19) of the gasket. The compression sealing surface 19 forms a compression seal with the exterior surface of the mating male pipe (not shown) when the mating male pipe is inserted within the socket end (45 in FIG. 1) of the thermoplastic pipe to form a pipe joint. The mating male pipe is typically formed of the same PVC material as the female pipe end and is a plain cylindrical member. It should be noted that, to the best of Applicant's knowledge, none of the presently existing composite sealing gasket designs used in the industry incorporate a compression sealing region. Rather, the standard designs in the industry at the present time use a lip seal as the primary sealing surface of the gasket body.

With further reference to FIG. 3, the compression sealing region of the gasket body slopes upwardly at lower surface 55, eventually forming a flattened tail region 57. The region illustrated generally at 57 in FIG. 3 may constitute a secondary sealing region of the gasket. The trailing tip 58 of the gasket body defines a sharp, angular region of the gasket body between the flattened tail region 57 and an outer surface 59. The outer surface 59 of the tail region 57 makes up the trailing body region of the gasket and has a series of recessed pockets 61 formed therein which provide a scallop-like pattern (best seen in FIG. 2) on the outer surface 59 of the trailing region of the gasket body. By scallop-like is meant, i.e., one of a continuous series of circle segments or angular projections forming a border (as on cloth or metal), Merriam-Webster's Online Dictionary, 2008.

Figure 2:
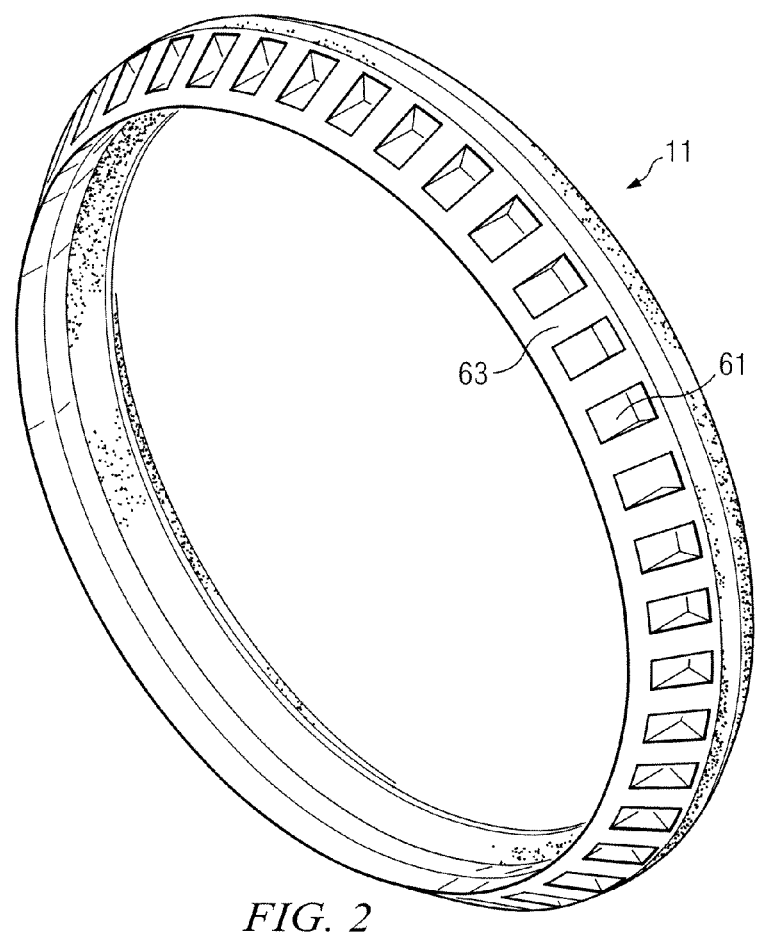
FIG. 2 is a perspective view of the sealing gasket of the invention showing the scallop-like external circumferential region thereof.

As best seen in FIGS. 2 and 3, the scallops form recessed regions (61 in FIG. 3) which are generally triangular in cross section having a horizontal lower extent 62 joined to a vertical extent 64, as viewed in FIG. 3. In the embodiment illustrated, the horizontal lower extents 62 form a long leg of the triangular cross section, while the vertical extents 64 form a short leg. In the example illustrated, the long legs 62 are approximately twice the length of the short legs 64. The recessed regions 61 which provide the scallop-like pattern on the outer surface 59 of the trailing region 49 of the gasket body are preferably located at evenly spaced locations about an outer circumferential region (63 in FIG. 2) of the gasket body with the lower extents 62 thereof being generally parallel and with the vertical extents 64 extending radially outward from the diametral axis 66 of the gasket.

As has been briefly explained, the outer circumferential region 61 of the gasket body contacts the groove (43 in FIG. 1) provided within the socket end 45 of the thermoplastic pipe during pipe belling operations to thereby integrally lock the gasket body within the pipe bell during the belling operation. Because the trailing region of the gasket is formed of a synthetic plastic material, the relatively harder nature of this region actually deforms the pipe bell groove region, the deformed regions being indicated as the striations 65 in FIG. 1 of the drawings. In other words, as the socket end 45 of the thermoplastic pipe is heated above its glass transition temperature, it becomes rubbery in nature and actually flows about the scalloped recesses. Because the scallop-like regions of the harder gasket body actually form a sort of indentation in the interior of the mouth of the pipe socket end as the pipe end cools during manufacture, the gasket is positively locked into position within the pipe mouth.

The terms "thermoplastic elastomer material" and "synthetic plastic material" are intended to be terms of art, as will be explained in greater detail in the paragraphs which follow. The nature of the materials used in forming the gasket body are significant due to that fact that, unlike the standard prior art gasket formed totally of a traditional elastomer, such as natural or synthetic rubber, the "composite gasket" of the invention has a leading region of a relatively softer (lower durometer) thermoplastic elastomer material (TPE) and a trailing region of a relatively harder (higher durometer) synthetic plastic material.

Turning first to the trailing region of the gasket body, the relatively harder synthetic plastic material is preferably a polyolefin, such as polypropylene, polypropylene, polyvinylchloride, etc. A preferred material for the synthetic plastic region of the gasket is polypropylene. The preferred polypropylene material is a high performance impact copolymer showing an appropriate stiffness for the application at hand. The material can be of higher durometer than the remaining portion of the gasket body since it does not participate in the sealing function of the gasket to any significant extent.

Turning now to the material used to form the leading region of the gasket body, the term "thermoplastic elastomer material" (referred to herein by the shorthand term "TPE") is a relatively newer family of materials known in the industry, as will be explained with reference to the previously used materials. The term "elastomer" as used herein will be intended to mean "any of various polymers having the elastic properties of natural rubber." Similarly, the term "plastic" will be used herein to mean "any of various organic compounds produced by polymerization, capable of being molded, extruded, cast into various shapes and films, or drawn into filaments."

Applicant's use of the term "thermoplastic elastomer material" or TPE is intended to encompass a special type of recently developed "engineered" elastomer. The members of this subset include, for example:
Thermoplastic elastomers (TPE), for example Elastron®, etc.
Thermoplastic Vulcanizates (TPV), for example Sarlink®, Santoprene® TPV or Exxon Mobil's Geoplast® TPV
Thermoplastic Polyurethane (TPU)
Thermoplastic Olefins (TPO)

The preferred thermoplastic elastomer material used for Applicant's leading region is a TPE "vulcanizate." These materials are polypropylene based elastomers that exhibit excellent compression set, flex fatigue and low/high temperature performance. They show very good chemical resistance quite appropriate for conveying the fluids found in sewer/waste water systems. Unlike the traditional elastomers used in sealing gasket manufacture, these products can be recycled and reprocessed since the physical and chemical properties of the materials are not degraded. The material can also be thermally bonded to form high strength bonds and in the present application, both the TPV and the PP are perfectly bonded due to their excellent compatibility.

An invention has been provided with several advantages. The improved sealing gasket is simple in design and economical to manufacture. The gasket features a "dual durometer" aspect in that the polypropylene trailing region is more rigid than the remainder of the leading region of the gasket body. The polypropylene planar, angled region of the gasket replaces rubber at neutral locations for sealing purposes. The polypropylene material provides the gasket with a very low coefficient of friction between the gasket and the PVC material of the pipe socket end. The polypropylene portion of the gasket has enough stiffness and rigidity to retain the gasket in the proper position on the belling mandrel during the belling process without deformation. The new shape enforces a more stable bell shape during subsequent belling operations and improves quality control. The new gasket is compatible with existing belling machines. The improved sealing gasket can be used in a Rieber type manufacturing process, but is more positively "integrally locked" within the retention groove of the socket pipe end during the belling operation. Because of the composite nature of the gasket body, the need for an internal metal reinforcing band is eliminated, thereby simplifying the belling operation and improving the cycle time of the manufacturing operation. The plastic portion of the gasket prevents "pivoting" the whole body of the gasket during belling, thus making the gasket more tolerant of off-center assemblies on the forming mandrel. Possibilities of "fish mounting" are minimized. The material make-up of the gasket body also eliminates the need for a lubricant during the belling operation. The materials of the gasket body make it suitable for color coding so that, for example, the gasket could be coded according to size or end use, e.g., as a sewer gasket or as a pressure gasket. Because of the plastic-like nature of the materials used to form the gasket body, any scrap material can be reused or recycled, thereby eliminating much of the scrap waste present in conventional belling operations. The sealing region of the gasket is formed of a suitable TPE material which allows bonding to the polypropylene (plastic) region of the gasket.

The gasket of the invention provides an ideal solution for PVC pipe joints. It can be used for applications in sewer, pressure and telephone or optic duct, as well as with PVC pipe.

While the invention has been shown in only one of its forms, it is not thus limited but is susceptible to various changes and modifications without departing from the spirit thereof.

What is claimed is:

1. A method of installing a gasket in a socket end of a female thermoplastic pipe which is used to form a pipe joint with a mating male pipe, the method comprising the steps of:
   providing a mandrel with an inner end and an outer end and having an outer working surface;
   installing a sealing gasket at a first circumferential location on the outer working surface;
   heating a socket end of the thermoplastic pipe;
   forcing the heated socket end of the thermoplastic pipe over the working surface of the mandrel and over the gasket, whereby the heated socket end of the thermoplastic pipe flows over the gasket to form a retention groove for retaining the sealing gasket;
   cooling the heated socket end of the thermoplastic pipe;
   retracting the cooled socket end of the thermoplastic pipe and the retained gasket from the working surface of the mandrel;
   the sealing gasket being formed as a ring shaped composite elastomeric body which, when viewed in cross section, has a leading region formed of a thermoplastic elastomer material and which has a trailing region formed of a synthetic plastic material, the leading region having an outer surface and an inner primary sealing surface which forms a seal with the exterior surface of the mating male pipe when the mating male pipe is inserted within the socket end of the thermoplastic pipe to form a pipe joint;
   wherein the trailing region of the ring shaped composite elastomeric body has a series of recessed pockets formed at spaced locations on an outer surface of the trailing region;
   wherein the sealing gasket body is seated at the first circumferential location so that the thermoplastic pipe is forced over the trailing region of the sealing gasket body and then over the leading region thereof as the socket end of the female thermoplastic pipe is heated, contact with the trailing region of the gasket body acting to deform the pipe socket end and flow sidewall material of the socket end into the recessed pockets of the trailing region to thereby integrally lock the sealing gasket within the subsequently formed retention groove in the pipe socket end;
   wherein the recessed pockets formed in the trailing region of the composite elastomeric body are separated from a lower, exposed surface of the gasket composite elastomeric body by an intermediate thickness of the trailing region so that the recessed pockets are isolated from fluid pressure in the pipe during use; and
   wherein the thermoplastic pipe socket end, when heated, becomes rubbery in nature, whereby the resulting rubbery pipe material flows about the gasket and fills the recessed regions, wherein the contact between the sealing gasket body and the heated socket end of the thermoplastic pipe during the belling operation structurally integrates the sealing gasket body with the pipe socket end, so that the trailing region of the sealing gasket is no longer required to act as a discrete structural member in the resulting pipe joint.

2. The method of claim 1, further comprising the steps of:
   providing a backup collar at a second circumferential location on the mandrel, the backup collar having an exposed lip portion which initially abuts the sealing gasket to retain the sealing gasket at the first circumferential location;
   wherein the backup collar is retracted once the heated thermoplastic pipe end is forced over the forming mandrel and the sealing gasket.

3. The method of claim 2, further comprising the step of applying a vacuum or positive external pressure to the heated, socket end of the thermoplastic pipe after the pipe has been forced over the working surface of the mandrel and over the trailing region of the sealing gasket and mandrel to thereby force the heated, socket end to contract about the mandrel and sealing gasket.

4. The method of claim 3, wherein the heated thermoplastic pipe is cooled by water or air after the mandrel is retracted.

* * * * *